US010800334B2

(12) United States Patent
Dodge

(10) Patent No.: US 10,800,334 B2
(45) Date of Patent: Oct. 13, 2020

(54) DUAL SIDE MIRROR ASSEMBLIES AND METHODS OF CONTROLLING THE SAME

(71) Applicant: Toyota Motor Engineering & Manufacturing North America, Inc., Plano, TX (US)

(72) Inventor: Brendan R. Dodge, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 108 days.

(21) Appl. No.: 16/254,913

(22) Filed: Jan. 23, 2019

(65) Prior Publication Data
US 2020/0231092 A1 Jul. 23, 2020

(51) Int. Cl.
*B60R 1/02* (2006.01)
*B60R 1/074* (2006.01)
*G02F 1/163* (2006.01)
*B60R 1/08* (2006.01)

(52) U.S. Cl.
CPC .............. *B60R 1/074* (2013.01); *B60R 1/088* (2013.01); *G02F 1/163* (2013.01)

(58) Field of Classification Search
CPC ......... B60R 1/074; B60R 1/088; G02F 1/163; G02F 1/153; G02F 1/157
USPC ........................................................ 359/267
See application file for complete search history.

(56) References Cited

U.S. PATENT DOCUMENTS

| 4,311,362 | A | 1/1982 | LaPorte |
| 4,486,075 | A | 12/1984 | Cohen |
| 4,828,379 | A | 5/1989 | Parsons et al. |
| 7,052,149 | B2 | 5/2006 | Suzuki et al. |
| 7,216,993 | B2 | 5/2007 | Murray |
| 2004/0184168 | A1* | 9/2004 | Murray .................. B60R 1/081 359/862 |
| 2005/0146604 | A1* | 7/2005 | Shinada ................... B60R 1/00 348/118 |
| 2006/0181759 | A1 | 8/2006 | Malhas |
| 2015/0002952 | A1 | 1/2015 | Castillo |

FOREIGN PATENT DOCUMENTS

| CN | 202294518 U | 7/2012 |
| JP | S64001643 A | 1/1989 |
| KR | 100976923 B1 | 8/2010 |

* cited by examiner

*Primary Examiner* — William R Alexander
*Assistant Examiner* — Henry A Duong
(74) *Attorney, Agent, or Firm* — Dinsmore & Shohl LLP

(57) ABSTRACT

A dual side mirror assembly, of a vehicle, includes a housing pivotally coupled to the vehicle between an unfolded position and a folded position. The housing includes a primary mirror coupled to the housing and a secondary mirror coupled to the housing. In the unfolded position, the primary mirror is in a reflective state and the secondary is in an unreflective state. In the folded position, the primary mirror is in the unreflective state and the secondary mirror is in the reflective state.

16 Claims, 2 Drawing Sheets

DUAL SIDE MIRROR ASSEMBLIES AND METHODS OF CONTROLLING THE SAME

TECHNICAL FIELD

The present specification generally relates to dual side mirror assemblies for a vehicle, and more particularly, dual side mirror assemblies including a housing pivotally between an unfolded position and a folded position.

BACKGROUND

It has been known to provide vehicles with folding side mirror assemblies that move between a use position and a stored position. In the use position, the side mirror assemblies include a mirror that faces rearwardly in a vehicle longitudinal direction to permit a driver a rearview of the vehicle. In the stored position, the side mirror assembly pivots inwardly such that the mirror faces inwardly in a vehicle lateral direction to reduce an overall width of the vehicle during non-use, such as when the vehicle is parked.

The previously known side mirror assemblies fail to provide for the use of the side mirror assemblies when in the stored position. Specifically, as the mirror faces inwardly in the vehicle lateral direction, a driver is unable to use the side mirror when in the stored position. As such, a drive is unable to take advantage of reductions in aerodynamic drag when the side mirror are in the stored position.

Accordingly, there is a need for a dual side mirror assembly of a vehicle, that includes a housing pivotally between an unfolded position and a folded position and that includes a primary mirror and a secondary mirror.

SUMMARY

In one embodiment, a dual side mirror assembly, of a vehicle, includes a housing pivotally coupled to the vehicle between an unfolded position and a folded position. The housing includes a primary mirror coupled to the housing and a secondary mirror coupled to the housing. In the unfolded position, the primary mirror is in a reflective state and the secondary is in an unreflective state. In the folded position, the primary mirror is in the unreflective state and the secondary mirror is in the reflective state.

In another embodiment, a method of controlling a dual side mirror assembly, of a vehicle, includes pivoting a housing between an unfolded position and a folded position with respect to the vehicle. The housing includes a primary mirror coupled to the housing and a secondary mirror coupled to the housing. The method also includes controlling, by an electronic control unit, the primary mirror to switch from a reflective state in the unfolded position to an unreflective state in the folded position and controlling, by the electronic control unit, the secondary mirror to switch from the unreflective state in the unfolded position to the reflective state in the folded position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
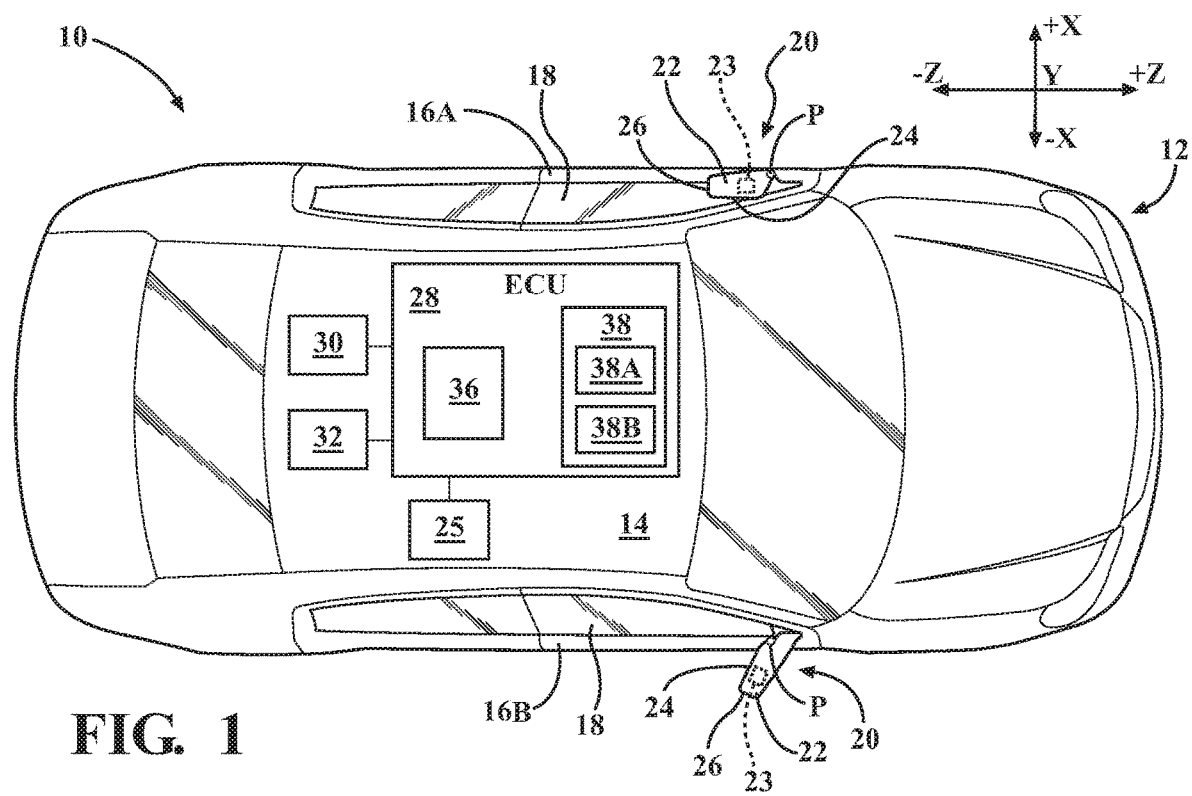
FIG. 1 schematically depicts a top view of a vehicle including a dual side mirror assembly, according to one or more embodiments shown or described herein.

Vehicles according to the present specification include dual side mirror assemblies that include a housing. The housing is pivotally coupled to a vehicle of the vehicle for movement between an unfolded position and a folded position. The housing includes a primary mirror coupled to the housing and a secondary mirror coupled to the housing. The primary mirror and the secondary mirror are configured to switch between a reflective state and an unreflective state upon movement of the housing between the folded position and the unfolded position. In the unfolded position, the primary mirror faces rearwardly in a vehicle longitudinal direction and the secondary mirror faces outwardly in a vehicle lateral direction. In the folded position, the primary mirror faces inwardly in the vehicle lateral direction and the secondary mirror faces rearwardly in the vehicle longitudinal direction.

When the housing is in the unfolded position, the primary mirror is in a reflective state and faces rearward in the vehicle longitudinal direction to provide a driver a reflected rear view from the primary mirror. As the secondary mirror faces outwardly in the vehicle lateral direction, the unreflective state of the secondary mirror inhibits a reflection from the secondary mirror outwardly in the vehicle lateral direction. When the housing is in the folded state, the secondary mirror is in a reflective state and faces rearward in the vehicle longitudinal direction to provide a driver a reflected rear view from the secondary mirror. As the primary mirror faces inwardly in the vehicle lateral direction, the unreflective state of the primary mirror inhibits a reflection from the primary mirror inwardly in the vehicle lateral direction.

As the secondary mirror is in the unreflective state when the housing is in the unfolded position, the secondary mirror is inhibited from engaging an intention of drivers of surrounding vehicles, while the driver is provided a reflected rear view from the primary mirror. Similarly, as the primary mirror is in the unreflective state when the housing is in the folded position, the primary mirror is inhibited from engaging an intention of the driver of the vehicle, while the driver is provided a reflected rear view from the secondary mirror.

Various embodiments of dual side mirror assemblies are described in detail below with reference to the appended drawings.

As used herein, the term "vehicle longitudinal direction" refers to the forward-rearward direction of the vehicle (i.e., in the +/− vehicle Z-direction as depicted). The term "vehicle lateral direction" refers to the cross-vehicle direction of the vehicle (i.e., in the +/− vehicle X-direction as depicted), and is transverse to the vehicle longitudinal direction. The term "vehicle vertical direction" refers to the upward-downward direction of the vehicle (i.e., in the +/− vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Referring to FIG. 1, a vehicle 10 is depicted. The vehicle 10 includes a vehicle body 12. The vehicle 10 also includes a cabin that is integral with the vehicle body 12. The cabin generally defines a passenger compartment 14 of the vehicle 10. The vehicle body 12 of the vehicle 10 includes one or more doors coupled to the vehicle body 12, specifically, the vehicle body 12 includes a front side driver door 16A and a front side passenger door 16B. Each of the front side driver door 16A and the front side passenger door 16B includes a window 18.

The vehicle 10 also includes dual side mirror assemblies 20 that are coupled to the vehicle body 12 of the vehicle 10. In the illustrated embodiment, the vehicle 10 includes a dual side mirror assembly 20 attached to each of the front side driver door 16A and the front side passenger door 16B. As the dual side mirror assembly 20 provided on the front side driver door 16A is of similar construction and operation as the dual side mirror assembly 20 provided on the front side passenger door 16B, discussion of only the dual side mirror assembly 20 provided on the front side driver door 16A will be provided.

The dual side mirror assembly 20 includes a housing 22, an actuator 23, a primary mirror 24, a secondary mirror 26, a voltage applicator 25, an electronic control unit 28, a vehicle state sensor 30, and an input 32.

The housing 22 is pivotally coupled to the vehicle body 12 about a pivot axis P. In some embodiments, the housing 22 is pivotally coupled to the front side driver door 16A and the front side passenger door 16B. The housing 22 is pivotal about the pivot axis P between an unfolded position, as shown on the front side passenger door 16B of FIG. 1, and a folded position, as shown on the front side driver door 16A of FIG. 1.

The actuator 23 is operatively connected to the electronic control unit 28. The actuator 23 is operatively coupled to the housing 22 to pivot the housing 22 about the pivot axis P between the unfolded position and the folded position. In some embodiments, the actuator 23 is a mechanical, electrical, or electromechanical motor connected to the housing 22.

Figure 2:
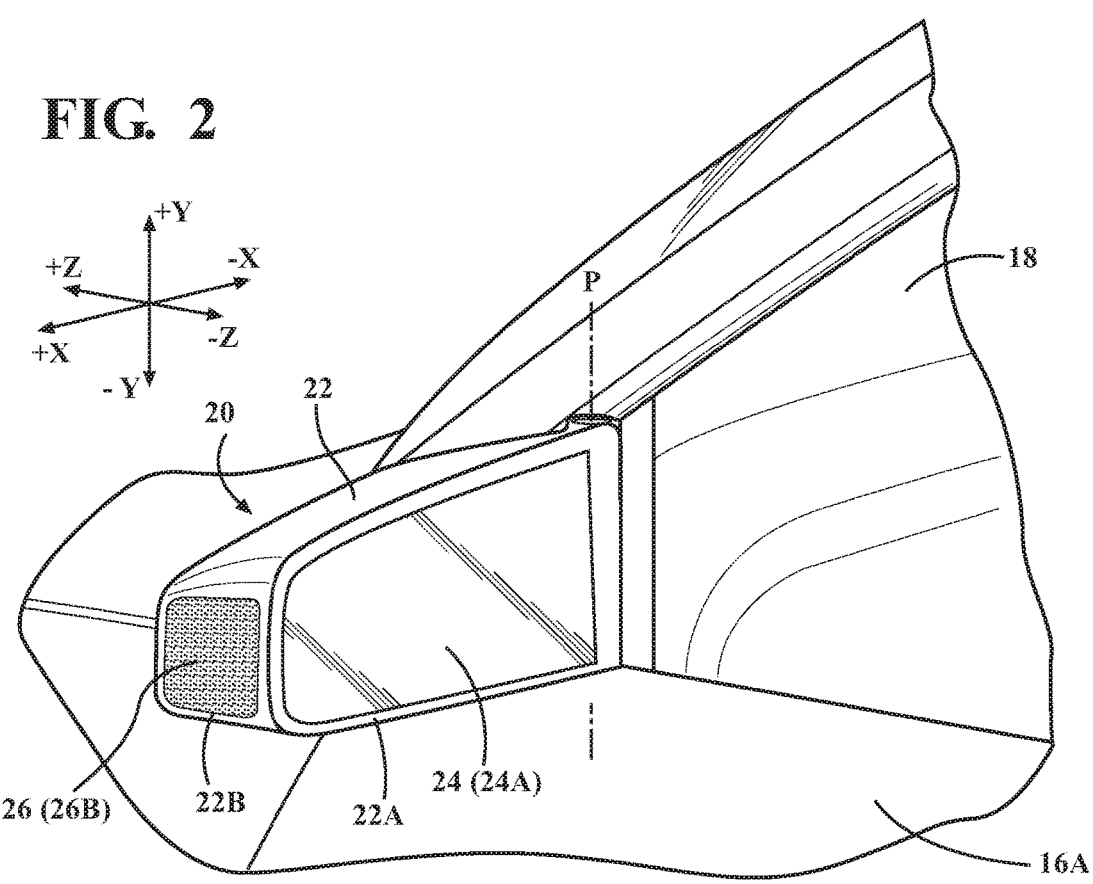
FIG. 2 schematically depicts a partial perspective view of a housing of the dual side mirror assembly of FIG. 1 in an unfolded position, according to one or more embodiments shown or described herein.
Figure 3:
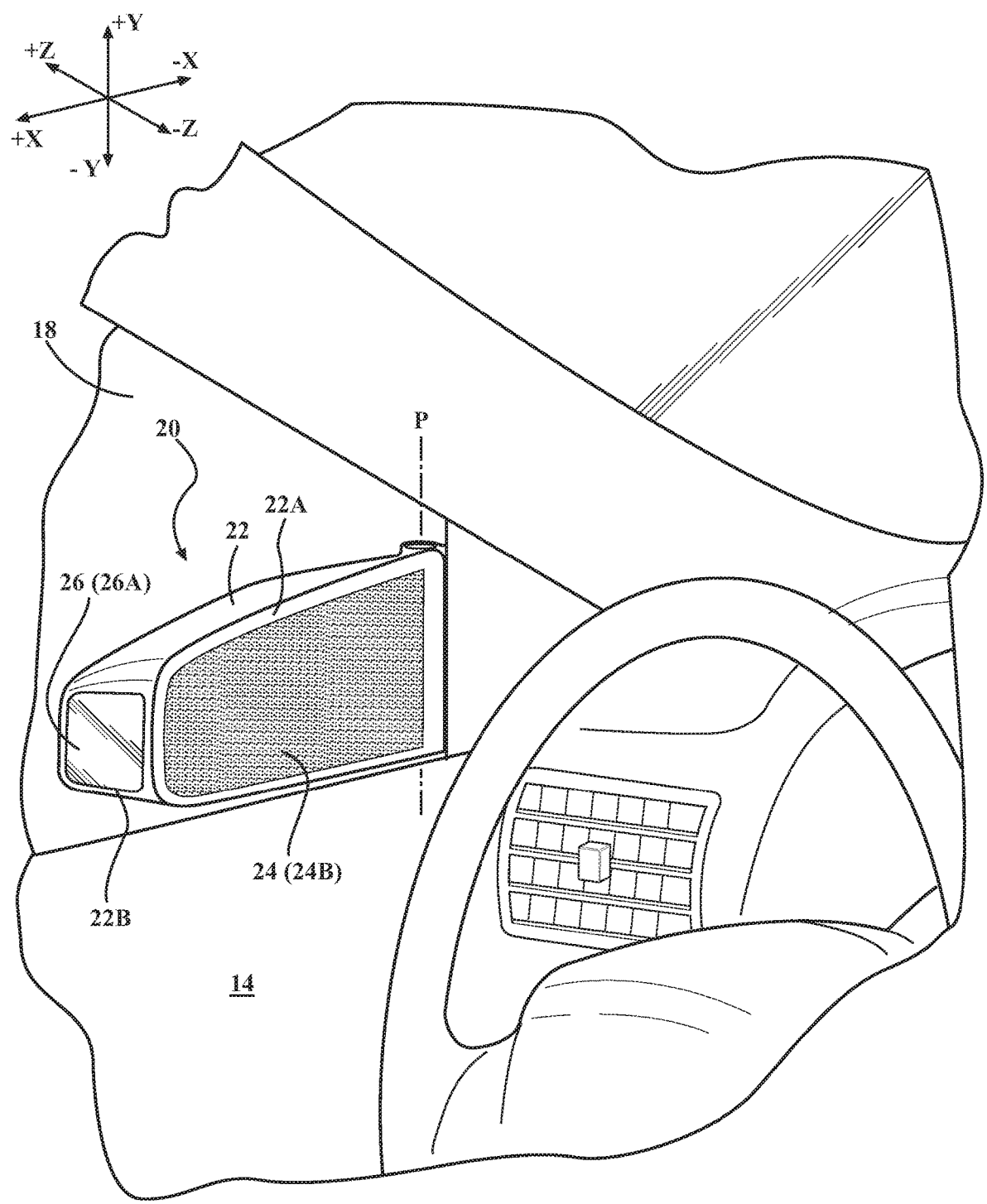
FIG. 3 schematically depicts a partial perspective view of a housing of the dual side mirror assembly of FIG. 1 in a folded position, according to one or more embodiments shown or described herein.

Referring to FIGS. 2 and 3, the primary mirror 24 is coupled to the housing 22. In some embodiments, the primary mirror 24 is at least partially received within a cavity formed on a first face 22A of the housing 22. The secondary mirror 26 is coupled to the housing 22. In some embodiments, the secondary mirror 26 is at least partially received within a cavity formed in a second face 22B of the housing 22. The second face 22B of the housing 22 is skewed with respect to the first face 22A such that the second face 22B and the first face 22A are not provided on a parallel plane. In some embodiments, the first face 22A is positioned so as to extend obliquely with respect to the second face 22B. In some other embodiments, the first face 22A is positioned so as to extend generally perpendicular with respect to the second face 22B.

The primary mirror 24 and the secondary mirror 26 are each formed of as an electrochromic device. Specifically, the primary mirror 24 is an electrochromic mirror and the secondary mirror 26 is an electrochromic mirror. The primary mirror 24 and the secondary mirror 26 are reversibly switchable between a reflective state and an unreflective state upon application of preset voltages by the voltage applicator 25.

As shown in FIG. 2, the housing 22 is in the unfolded state with the primary mirror 24 in the reflective state (i.e. the primary mirror 24 configured as a reflective surface 24A) and the secondary mirror 26 in the unreflective state (i.e. the secondary mirror 26 configured as an unreflective surface 26B). As shown in FIG. 3, the housing 22 is in the folded state with the primary mirror 24 in the unreflective state (i.e. the primary mirror 24 configured as an unreflective surface 24B) and the secondary mirror 26 in the reflective state (i.e. the secondary mirror 26 configured as a reflective surface 26A).

In the reflective state, the primary mirror 24 and the secondary mirror 26 are each configured as reflective surfaces that reflect light as a conventional mirror. In the unreflective state, the primary mirror 24 and the secondary mirror 26 are each configured as unreflective surfaces that inhibit the reflection of light therefrom. In the unreflective states, the primary mirror 24 and the secondary mirror 26 are dimmed to darken to a color (e.g. black) that inhibits and/or prevents reflections thereon.

The voltage applicator 25 is in communication with the electronic control unit 28 and the primary mirror 24 and secondary mirror 26. The voltage applicator 25 is configured to apply preset voltages individually to the primary mirror 24 and the secondary mirror 26 through a wiring connection. In some embodiments, the voltage applicator 25 is a micro-controlled digital circuit that is in communication with the electronic control unit 28, and in which the micro-controlled digital circuit applies preset voltages to the primary mirror 24 and the secondary mirror 26.

In the reflective state, the voltage applicator 25 applies a preset reflective voltage to the primary mirror 24 and the secondary mirror 26 to configure the primary mirror 24 and the secondary mirror 26 as reflective surfaces. In the unreflective state, the voltage applicator 25 applies a preset unreflective voltage to the primary mirror 24 and the secondary mirror 26 to configure the primary mirror 24 and the secondary mirror 26 as unreflective surfaces. Specifically, the preset unreflective voltage applied by the voltage applicator 25 dims the primary mirror 24 and the secondary mirror 26 to darken to black to inhibit reflections therefrom so as to configured the primary mirror 24 and the secondary mirror 26 as unreflective surfaces that inhibits and/or prevents reflections therefrom.

The voltage applicator 25 is configured to apply the preset voltages individually to the primary mirror 24 and the secondary mirror 26. For example, the voltage applicator 25 is configured to simultaneously apply the preset reflective voltage to the primary mirror 24 and apply the preset unreflective voltage to the secondary mirror 26. Similarly, the voltage applicator 25 is configured to simultaneously apply the preset unreflective voltage to the primary mirror 24 and apply the preset reflective voltage to the secondary mirror 26. As will be described in greater detail below, the voltage applicator 25 is controlled by the electronic control unit 28.

The electronic control unit 28 includes a processor 36 and a memory unit 38 coupled to the processor 36. The processor 36 includes processing components operable to receive and execute instructions from the memory unit 38. The memory unit 38 stores detection logic 38A and control logic 38B. The detection logic 38A and the control logic 38B may each include a plurality of different pieces of logic, each of which may be embodied as a computer program, firmware, and/or software/hardware.

In some embodiments, the memory unit 38 is configured as volatile and/or nonvolatile memory and as such may include random access memory (SRAM, DRAM, and/or other types of RAM), flash memory, secure digital (SD) memory, registers, compact discs, digital versatile discs (DVD), and/or other types of nontransitory computer readable mediums. Depending on the particular embodiments, these nontransitory computer readable mediums may reside within the electronic control unit 28 and/or external to the electronic control unit 28.

The vehicle state sensor 30 is operatively connected to the electronic control unit 28. The vehicle state sensor 30 is a sensor configured to sense and/or detect a state of the vehicle 10. In some embodiments, the vehicle state sensor 30 is a vehicle speed sensor that detects/senses a speed of the vehicle 10. The input 32 is operatively connected to the electronic control unit 28. The input 32 is an input configured to be actuated by a user. In some embodiments, the input 32 is actuated by the user to output a control signal to control the dual side mirror assemblies 20 to move the housing 22 between the unfolded position, as shown in FIG. 2, and the folded position, as shown in FIG. 3.

As discussed in greater detail below, the electronic control unit 28 is configured to control the actuator 23 to move the housing 22 between the unfolded position and the folded position. The electronic control unit 28 is configured to control the voltage applicator 25 to apply the preset reflective voltage to the primary mirror 24 and apply the preset unreflective voltage to the secondary mirror 26 when the housing 22 is in the unfolded state. The electronic control unit 28 is also configured to control the voltage applicator 25 to apply the preset unreflective voltage to the primary mirror 24 and apply the preset reflective voltage to the secondary mirror 26 when the housing 22 is in the folded state.

In order to facilitate a better understanding, operation of the dual side mirror assembly 20 will now be discussed. Initially, the housing 22 is in the unfolded state with the primary mirror 24 in the reflective state (i.e. the primary mirror 24 configured as a reflective surface 24A) and the secondary mirror 26 in the unreflective state (i.e. the secondary mirror 26 configured as an unreflective surface 26B), as shown in FIG. 3.

The housing 22 is moveable between the unfolded state and the folded state upon determination that a predetermined condition is satisfied. In some embodiments, the predetermined condition is satisfied upon detection of the control signal from the actuation of the input 32 by the detection logic 38A. In some other embodiments, the predetermined condition is satisfied upon determination that a signal from the vehicle state sensor 30 indicating the speed of the vehicle 10 is equal to or greater than a predetermined speed by the detection logic 38A. In some embodiments, the predetermined speed is 45 mph, 50 mph, 55 mph, 60 mph, 65 mph, or greater than 70 mph. In some embodiments, the predetermined speed is set by a user in advance.

In response to the determination that the predetermined condition is satisfied, the control logic 38B is executable by the processor 36 to control the actuator 23 to move the housing 22 from the unfolded position to the folded position and to control the voltage applicator 25 to apply the preset unreflective voltage to the primary mirror 24 and to apply the preset reflective voltage to the secondary mirror 26. As such, the housing 22 is moved into the folded state with the primary mirror 24 in the unreflective state (i.e. the primary mirror 24 configured as the unreflective surface 24B) and the secondary mirror 26 in the reflective state (i.e. the secondary mirror 26 configured as the reflective surface 26A) as shown in FIG. 3.

By switching the housing 22 from the unfolded position to the folded position, the vehicle 10 is provided with a decrease in overall width and a reduction of aerodynamic drag. Further, by switching the primary mirror 24 from the reflective state to the unreflective state when the housing 22 is in the folded position, reflections from the primary mirror 24 into the passenger compartment 14 are inhibited and/or prevented.

In some embodiments, upon determination that the predetermined condition is no longer satisfied, the control logic 38B is executable by the processor 36 to control the actuator 23 to move the housing 22 from the folded position to the unfolded position and to control the voltage applicator 25 to apply the preset reflective voltage to the primary mirror 24 and to apply the preset unreflective voltage to the secondary mirror 26. As such, the housing 22 is in the unfolded state with the primary mirror 24 in the reflective state (i.e. the primary mirror 24 configured as the reflective surface 24A) and the secondary mirror 26 in the unreflective state (i.e. the secondary mirror 26 configured as the unreflective surface 26B) as shown in FIG. 2.

By switching the housing 22 from the folded position to the unfolded position, the vehicle 10 is provided with a change in stylistic appearance. Further, by switching the secondary mirror 26 from the reflective state to the unreflective state when the housing 22 is in the unfolded position, reflections from the secondary mirror 26 outwardly in the vehicle lateral direction are inhibited and/or prevented. Accordingly, the vehicle 10 is inhibited and/or prevented from having the secondary mirror 26 reflect light outwardly in the vehicle lateral direction.

In some embodiments, the electronic control unit 28 controls the actuator 23 and the voltage applicator 25 to switch the position of the housing 22 and the states of the primary mirror 24 and the secondary mirror 26 simultaneously with the determination that the predetermined condition is no longer satisfied, for example, upon actuation of the input 32. In some other embodiments, the electronic control unit 28 controls the actuator 23 and the voltage applicator 25 to switch the position of the housing 22 and the states of the primary mirror 24 and the secondary mirror 26 after an elapse of a preset time after the determination that the predetermined condition is no longer satisfied, or upon the determination that the predetermined condition is continuously not satisfied for a preset period of time, for example, upon determination that the speed of the vehicle 10 detected by the vehicle state sensor 30 is less than the predetermined threshold for a preset period of time.

It should now be understood that the present disclosure includes dual side mirror assemblies and methods for controlling dual side mirror assemblies. In embodiments, the dual side mirror assemblies include a housing. The housing is pivotally coupled to a vehicle body of the vehicle for movement between an unfolded position and a folded position. The housing includes a primary mirror coupled to the housing and a secondary mirror coupled to the housing. The primary mirror and the secondary mirror are configured to switch between a reflective state and an unreflective state upon movement of the housing between the folded position and the unfolded position. In the unfolded position, the primary mirror faces rearwardly in a vehicle longitudinal direction and the secondary mirror faces outwardly in a vehicle lateral direction. In the folded position, the primary mirror faces inwardly in the vehicle lateral direction and the secondary mirror faces rearwardly in the vehicle longitudinal direction.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dual side mirror assembly of a vehicle, the dual side mirror assembly comprising:
   a housing pivotally coupled to the vehicle between an unfolded position and a folded position, the housing includes a primary mirror coupled to the housing and a secondary mirror coupled to the housing, in the unfolded position the primary mirror is in a reflective state and the secondary is in an unreflective state, and in the folded position the primary mirror is in the unreflective state and the secondary mirror is in the reflective state.

2. The dual side mirror assembly of claim 1, wherein in the unfolded position the primary mirror faces rearwardly in a vehicle longitudinal direction and the secondary mirror faces outwardly in a vehicle lateral direction, and in the folded position the primary mirror faces inwardly in the vehicle longitudinal direction and the secondary mirror faces rearwardly in the vehicle longitudinal direction.

3. The dual side mirror assembly of claim 2, wherein in the reflective state the primary mirror is configured as a reflective surface and in the unreflective state the primary mirror is configured as an unreflective surface, and in the reflective state the secondary mirror is configured as a reflective surface and in the unreflective state the secondary mirror is configured as an unreflective surface.

4. The dual side mirror assembly of claim 3, wherein the primary mirror is an electrochromic mirror configured to switch between the reflective state and unreflective state, and the secondary mirror is an electrochromic mirror configured to switch between the reflective state and unreflective state.

5. The dual side mirror assembly of claim 4 further comprising an electronic control unit operatively connected to the primary mirror and the secondary mirror, the electronic control unit is configured to control the primary mirror to switch from the reflective state when the housing is in the unfolded position to the unreflective state when the housing is in the folded position, and the electronic control unit is configured to control the secondary mirror to switch from the unreflective state when the housing is in the unfolded position to the reflective state when the housing is in the folded position.

6. The dual side mirror assembly of claim 5 further comprising an actuator operatively connected to the housing and the electronic control unit, the actuator is configured to move the housing between the unfolded position and the folded position.

7. The dual side mirror assembly of claim 6, wherein the electronic control unit is configured to control the actuator to move the housing between the unfolded position and the folded position upon satisfaction of a predetermined condition.

8. The dual side mirror assembly of claim 7, wherein the predetermined condition is satisfied when a speed of the vehicle is equal to or greater than a predetermined threshold.

9. The dual side mirror assembly of claim 7, wherein the predetermined condition is satisfied upon actuation of an input provided in the vehicle.

10. A method of controlling a dual side mirror assembly of a vehicle, the method comprising:
    pivoting a housing between an unfolded position and a folded position with respect to the vehicle, the housing includes a primary mirror coupled to the housing and a secondary mirror coupled to the housing; and
    controlling, by an electronic control unit, the primary mirror to switch from a reflective state in the unfolded position to an unreflective state in the folded position and controlling, by the electronic control unit, the secondary mirror to switch from the unreflective state in the unfolded position to the reflective state in the folded position.

11. The method of claim 10, wherein in the unfolded position the primary mirror faces rearwardly in a vehicle longitudinal direction and the secondary mirror faces outwardly in a vehicle lateral direction, and in the folded position the primary mirror faces inwardly in the vehicle longitudinal direction and the secondary mirror faces rearwardly in the vehicle longitudinal direction.

12. The method of claim 11, wherein in the reflective state the primary mirror is configured as a reflective surface and in the unreflective state the primary mirror is configured as an unreflective state, and in the reflective state the secondary mirror is configured as a reflective surface and in the unreflective state the secondary mirror is configured as an unreflective surface.

13. The method of claim 12, wherein the primary mirror and is an electrochromic mirror configured to switch between the reflective state and unreflective state, and the secondary mirror is an electrochromic mirror configured to switch between the reflective state and unreflective state.

14. The method of claim 13 further wherein the electronic control unit controls an actuator coupled to the housing to pivot the housing between the unfolded position and the folded position upon satisfaction of a predetermined condition.

15. The method of claim 14, wherein the predetermined condition is satisfied when a speed of the vehicle is equal to or greater than a predetermined threshold.

16. The method of claim 15, wherein the predetermined condition is satisfied upon actuation of an input provided in the vehicle.

* * * * *